United States Patent
Weese et al.

(10) Patent No.: US 11,080,858 B2
(45) Date of Patent: Aug. 3, 2021

(54) METHOD AND APPARATUS FOR SEGMENTING TWO DIMENSIONAL IMAGES OF AN ANATOMICAL STRUCTURE

(71) Applicant: KONINKLIJKE PHILIPS N.V., Eindhoven (NL)

(72) Inventors: Rolf Jürgen Weese, Norderstedt (DE); Alexandra Groth, Hamburg (DE); Jochen Peters, Norderstedt (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 37 days.

(21) Appl. No.: 16/463,866

(22) PCT Filed: Dec. 8, 2017

(86) PCT No.: PCT/EP2017/082050
§ 371 (c)(1),
(2) Date: May 24, 2019

(87) PCT Pub. No.: WO2018/108740
PCT Pub. Date: Jun. 21, 2018

(65) Prior Publication Data
US 2019/0287253 A1 Sep. 19, 2019

(30) Foreign Application Priority Data
Dec. 12, 2016 (EP) .................................. 16203333

(51) Int. Cl.
*G06T 7/12* (2017.01)
*G06T 7/149* (2017.01)
(Continued)

(52) U.S. Cl.
CPC .............. *G06T 7/12* (2017.01); *G06T 7/0016* (2013.01); *G06T 7/149* (2017.01); *G06T 7/174* (2017.01);
(Continued)

(58) Field of Classification Search
CPC ........... G06T 7/12; G06T 7/149; G06T 7/174; G06T 7/0016; G06T 2207/10132;
(Continued)

(56) References Cited

U.S. PATENT DOCUMENTS 7,376,253 B2   5/2008  Spreeuwers et al.
7,613,500 B2 * 11/2009  Vass ...................... A61B 6/032
                                                      382/131
(Continued)

OTHER PUBLICATIONS

Chalana, V. et al., "A Multiple Active Contour Model for Cardiac Boundary Detection on Echocardiographic Sequences", IEEE Transactions on Medical Imaging, IEEE Service Center, vol. 15, No. 3, Jun. 1, 1996.
(Continued)

*Primary Examiner* — Sheela C Chawan (57) ABSTRACT

There is provided a method and apparatus for segmenting two-dimensional images of an anatomical structure. A time sequence of two-dimensional images of the anatomical structure is acquired (202) and a segmentation model for the anatomical structure is acquired (204). The segmentation model comprises a plurality of segments. The acquired segmentation model is applied to the entire time sequence of two-dimensional images of the anatomical structure simultaneously in time and space to segment the time sequence of two-dimensional images by way of the plurality of segments (206).

20 Claims, 5 Drawing Sheets (51) Int. Cl.
*G06T 7/174* (2017.01)
*G06T 7/00* (2017.01)

(52) U.S. Cl.
CPC ...... *G06T 2200/24* (2013.01); *G06T 2207/10016* (2013.01); *G06T 2207/10132* (2013.01); *G06T 2207/20116* (2013.01); *G06T 2207/20124* (2013.01); *G06T 2207/30048* (2013.01)

(58) Field of Classification Search
CPC . G06T 2207/20124; G06T 2207/20116; G06T 2200/24; G06T 2207/10016; G06T 2207/30048
USPC ....... 382/100, 128, 130, 131, 132, 168, 170, 382/173, 176, 177, 179, 254, 260, 261; 600/300, 407, 425, 427, 437, 443; 345/418, 419
See application file for complete search history.

(56) References Cited

U.S. PATENT DOCUMENTS

| | | | |
|---|---|---|---|
| 10,235,750 B2 | 3/2019 | Xulei et al. | |
| 10,729,502 B1* | 8/2020 | Wolf | G06N 20/00 |
| 2006/0147114 A1 | 7/2006 | Kaus et al. | |
| 2006/0239553 A1* | 10/2006 | Florin | G06T 7/12 382/173 |
| 2010/0149174 A1* | 6/2010 | Nakao | G06T 15/08 345/419 |
| 2013/0267846 A1 | 10/2013 | Patwardhan et al. | |
| 2014/0074614 A1* | 3/2014 | Mehanian | G06Q 30/0201 705/14.64 |
| 2015/0127455 A1* | 5/2015 | Penzotti | G06Q 30/0251 705/14.49 |
| 2016/0228190 A1* | 8/2016 | Georgescu | A61B 8/065 |
| 2018/0336689 A1* | 11/2018 | Kabus | G06T 7/337 |
| 2020/0051247 A1* | 2/2020 | Groth | G06T 7/0012 |

OTHER PUBLICATIONS

Hamarneh, G. et al., "Deformable spatio-temporal shape models: extending active shape models to 2D+time", Image and Vision Computing, vol. 22, No. 6, Jun. 1, 2005.

Kucera, D. et al., "Segmentation of sequences of echocardiographic images using a simplified 3D active contour model with region-based external forces", Computerized Medical Imaging and Graphics., vol. 21, No. 1, Jan. 1, 1997, pp. 1-21.

Mitchell, S.C. et al., "Time Continuous Segmentation of Cardiac MR Image Sequences Using Active Appearance Motion Models", Optomechatronic Micro/Nano Devices and Components III: Oct. 8-10, 2007, Lausanne, Switzer; Proceedings of SPIE, vol. 4322, Feb. 19, 2001.

Lim, C.W. et al., "Automatic 4D Reconstruction of Patient-Specific Cardiac Mesh with 1-to-1 Vertex Correspondence from Segmented Contours Lines", PLOS ONE, www.plosone.org, Apr. 2014, vol. 9, Issue 4, pp. 1-14.

Yang—, X. et al., "Right Ventricle Segmentation by Temporal Information Constrained Gradient Vector Flow", 2013IEEE International Conference on Systems, Man and Cybernetics, Oct. 13-16, 2013, Manchester, UK.

Cousty, J. et al., "Segmentation of 4D Cardiac MRI: Automated Method Based on Spatio-Temporal Watershed Cuts", Image and Vision Computing, vol. 28, Issue 8, pp. 1229-1243, Aug. 2010.

Ecabert, O. et al., "Automatic Model-based Segmentation of the Heart in CT Images", IEEE Transactions on Medical Imaging 2008, 27(9), 1189-1201.

International Search Report—PCT/EP2017/082050, dated Dec. 8, 2017.

* cited by examiner

METHOD AND APPARATUS FOR SEGMENTING TWO DIMENSIONAL IMAGES OF AN ANATOMICAL STRUCTURE

CROSS-REFERENCE TO PRIOR APPLICATIONS

This application is the U.S. National Phase application under 35 U.S.C. § 371 of International Application No. PCT/EP2017/082050, filed on Dec. 8, 2017, which claims the benefit of European Patent Application No. 16203333.6, filed on Dec. 12, 2016. These applications are hereby incorporated by reference herein.

TECHNICAL FIELD OF THE INVENTION

The invention relates to the field of medical imaging and, in particular, to a method and apparatus for segmenting two-dimensional images of an anatomical structure.

BACKGROUND TO THE INVENTION

Medical imaging is a useful tool for providing visual representations of anatomical structures (for example, organs) in images. There exist many different types of medical imaging techniques including computed tomography (CT), magnetic resonance (MR), ultrasound (US), X-ray, and similar. The images acquired from medical imaging can prove valuable for clinical analysis of a subject and, where necessary, medical intervention.

Although all relevant image modalities (such as CT, MR, US, and X-ray) are nowadays capable of acquiring three-dimensional (3D) images, physicians still acquire sequences of two-dimensional (2D) images on a regular basis in order to obtain improved images (for example, images with a higher resolution). For example, in US and MR imaging of a heart, two-dimensional images in standard views (such as 2, 3 and 4 chamber views) are acquired. For the segmentation of two-dimensional images, various algorithms exist in literature such as active contour models (which are also referred to as snakes).

A sequence of two-dimensional images is often acquired in order to track a movement over time (for example, the contraction of the heart ventricles when monitoring the heart over the heart cycle). However, existing techniques for the segmentation of a time sequence of two-dimensional images are performed on a slice-by-slice basis. For example, WO 2015/130231 discloses segmenting a first frame of an image and then using the result to segment other frames of the image, where the segmented contours of previous and/or subsequent frames are used to refine the result of a current frame. Thus, following segmentation according to the existing techniques, temporal smoothing is often performed.

However, even when temporal smoothing is performed after segmentation, incomplete information regarding the temporal variation of the imaged anatomical structure is taken into account during the segmentation process itself since each two-dimensional image is segmented separately. This prohibits time-consistent segmentation of contours in the two-dimensional images. Therefore, the existing techniques for segmenting a time sequence of two-dimensional cross-sectional images of an anatomical structure can be inaccurate.

There is thus a need for an improved method and apparatus for segmenting two-dimensional images of an anatomical structure.

SUMMARY OF THE INVENTION

As noted above, the limitation with existing approaches for segmenting two-dimensional images is that time-consistent segmentation of contours in the two-dimensional images is not possible and thus segmentation of a time sequence of two-dimensional images can be inaccurate. It would thus be valuable to have a method and apparatus that can segment two-dimensional images of an anatomical structure in a manner that overcomes these existing problems.

Therefore, according to a first aspect of the invention, there is provided a method for segmenting two-dimensional images of an anatomical structure. The method comprises acquiring a time sequence of two-dimensional images of the anatomical structure, acquiring a segmentation model for the anatomical structure, wherein the segmentation model comprises a plurality of segments, and applying the acquired segmentation model to the entire time sequence of two-dimensional images of the anatomical structure simultaneously in time and space to segment the time sequence of two-dimensional images by way of the plurality of segments.

In some embodiments, each two-dimensional image of the anatomical structure may comprise a respective time stamp representative of a third dimension of the two-dimensional image. In some embodiments, the method may further comprise converting the acquired time sequence of two-dimensional images of the anatomical structure into a three-dimensional image volume based on a conversion factor for the respective time stamps. In some embodiments, the conversion factor may be selected based on a level of anisotropy for the three-dimensional image volume.

In some embodiments, the acquired segmentation model for the anatomical structure may be configured to model a shape variability of the anatomical structure over time. In some embodiments, the segmentation model may comprise one or more layers of segments and at least one layer of segments may be applied to each two-dimensional image. In some embodiments, each of the one or more layers of segments may be connected to at least one other layer of segments.

In some embodiments, applying the acquired segmentation model may comprise any one or more of: simultaneously in time and space detecting the anatomical structure in the time sequence of two-dimensional images to place the segmentation model at the location of the anatomical structure in the time sequence of two-dimensional images, simultaneously in time and space transforming the segmentation model to correspond to the time sequence of two-dimensional images, and simultaneously in time and space deforming the segmentation model to adapt a shape of the segmentation model to a shape of the anatomical structure in the time sequence of two-dimensional images.

In some embodiments, transforming the segmentation model may comprise a piecewise parametric transformation simultaneously in time and space to adapt a phase of the segmentation model to correspond to a phase of the time sequence of two-dimensional images.

In some embodiments, the time sequence of two-dimensional images and the acquired segmentation model may be cyclic. In some embodiments, the method may further comprise extracting an intensity profile of the cyclic time sequence of two-dimensional images in time and space and, for one or more of the plurality of segments of the cyclic segmentation model, detecting one or more boundaries of the anatomical structure in the cyclic time sequence of two-dimensional images based on the extracted intensity profile.

In some embodiments, the method may further comprise processing the segmented time sequence of two-dimensional images to determine a movement pattern of the anatomical structure and comparing the determined movement pattern of the anatomical structure to one or more movement pattern models, wherein each movement pattern model is associated with a disease, to determine a disease associated with the determined movement pattern.

According to a second aspect of the invention, there is provided a computer program product comprising a computer readable medium, the computer readable medium having computer readable code embodied therein, the computer readable code being configured such that, on execution by a suitable computer or processor, the computer or processor is caused to perform the method or the methods described above.

According to a third aspect of the invention, there is provided an apparatus for segmenting two-dimensional images of an anatomical structure. The apparatus comprises a processor configured to acquire a time sequence of two-dimensional images of the anatomical structure, acquire a segmentation model for the anatomical structure, wherein the segmentation model comprises a plurality of segments, and apply the acquired segmentation model to the entire time sequence of two-dimensional images of the anatomical structure simultaneously in time and space to segment the time sequence of two-dimensional images using the plurality of segments.

In some embodiments, the processor may be configured to control one or more user interfaces to render the segmented time sequence of two-dimensional images.

According to the aspects and embodiments described above, the limitations of existing techniques are addressed. In particular, according to the above-described aspects and embodiments, the whole time sequence of two-dimensional images are segmented at the same time. This enables time-consistent segmentation of two-dimensional images. Moreover, the segmentation model can slide in time during segmentation and thus by such a model, not only the shape of contours in the two-dimensional images can be adapted during segmentation, but also the topology of the contours. In this way, a more accurate segmentation of a time sequence of two-dimensional images can be achieved.

There is thus provided an improved method and apparatus for segmenting two-dimensional images of an anatomical structure, which overcomes the existing problems.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE PREFERRED EMBODIMENTS

As noted above, the invention provides an improved method and apparatus for segmenting two-dimensional images of an anatomical structure, which overcomes the existing problems.

Figure 1:
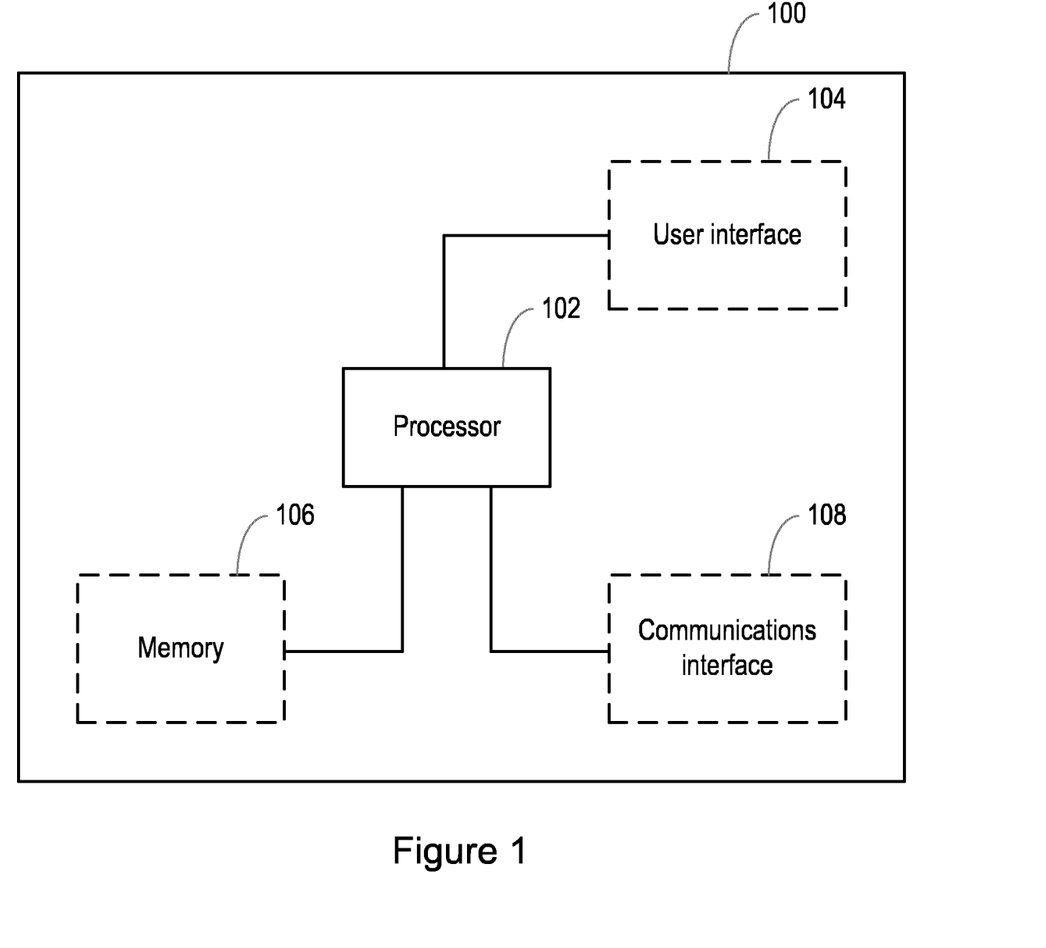
FIG. 1 is a block diagram of an apparatus according to an embodiment.

FIG. 1 shows a block diagram of an apparatus 100 according to an embodiment that can be used for segmenting two-dimensional (2D) images of an anatomical structure. The two-dimensional images of an anatomical structure can be any time sequence of two-dimensional images of the anatomical structure. In some embodiments, the two-dimensional images may comprise two-dimensional slices through a three-dimensional image. The two-dimensional images can be two-dimensional medical images. Examples include, but are not limited to, two-dimensional computed tomography (CT) images, two-dimensional magnetic resonance (MR) images, two-dimensional ultrasound (US) images, two-dimensional positron emission tomography (PET) images, two-dimensional single photon emission computed tomography (SPECT) images, two-dimensional nuclear medicine images, or any other two-dimensional medical images.

The anatomical structure in the two-dimensional images may be an organ such as a heart, a lung, an intestine, a kidney, a liver, or any other anatomical structure. The anatomical structure in the two-dimensional images can comprise one or more anatomical parts. For example, two-dimensional images of the heart can comprise a ventricle, an atrium, an aorta, and/or any other part of the heart. Although examples have been provided for the type of two-dimensional images and for anatomical structure (and the parts of the anatomical structure) in the two-dimensional images, it will be understood that the invention may also be used for segmenting any other type of two-dimensional images and any other anatomical structures in the two-dimensional images.

The apparatus 100 comprises a processor 102 that controls the operation of the apparatus 100 and that can implement the method described herein. The processor 102 can comprise one or more processors, processing units, multi-core processors or modules that are configured or programmed to control the apparatus 100 in the manner described herein. In particular implementations, the processor 102 can comprise a plurality of software and/or hardware modules that are each configured to perform, or are for performing, individual or multiple steps of the method according to embodiments of the invention.

Briefly, the processor 102 is configured to acquire a time sequence of two-dimensional images of the anatomical structure, acquire a segmentation model for the anatomical structure (wherein the segmentation model comprises a plurality of segments), and apply the acquired segmentation model to the entire time sequence of two-dimensional images of the anatomical structure simultaneously in time and space to segment the time sequence of two-dimensional images using the plurality of segments.

In some embodiments, the apparatus 100 may also comprise at least one user interface 104. Alternatively or in addition, at least one user interface 104 may be external to (i.e. separate to or remote from) the apparatus 100. For example, at least one user interface 104 may be part of another device.

A user interface 104 may be for use in providing a user of the apparatus 100 (for example, a healthcare provider, a healthcare specialist, a care giver, a subject, or any other user) with information resulting from the method according to the invention. The processor 102 may be configured to control one or more user interfaces 104 to provide information resulting from the method according to the invention. For example, the processor 102 may be configured to control one or more user interfaces 104 to render (or output or display) the segmented time sequence of two-dimensional images. Alternatively or in addition, a user interface 104 may be configured to receive a user input. In other words, a user interface 104 may allow a user of the apparatus 100 to manually enter instructions, data, or information. For example, in some embodiments, the user interface 104 may allow a user of the apparatus 100 to adjust the segmentation model following the segmentation of the time sequence of two-dimensional images. The processor 102 may be configured to acquire the user input from one or more user interfaces 104.

A user interface 104 may be any user interface that enables rendering (or output or display) of information, data or signals to a user of the apparatus 100. Alternatively or in addition, a user interface 104 may be any user interface that enables a user of the apparatus 100 to provide a user input, interact with and/or control the apparatus 100. For example, the user interface 104 may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, the apparatus 100 may also comprise a memory 106 configured to store program code that can be executed by the processor 102 to perform the method described herein. Alternatively or in addition, one or more memories 106 may be external to (i.e. separate to or remote from) the apparatus 100. For example, one or more memories 106 may be part of another device. A memory 106 can be used to store models, images, information, data, signals and measurements acquired or made by the processor 102 of the apparatus 100 or from any interfaces, memories or devices that are external to the apparatus 100. For example, a memory 106 may be used to store an acquired time sequence of two-dimensional images of an anatomical structure, one or more segmentation models for anatomical structures (which may, for example, comprise one or more segmentation models for the anatomical structure in the acquired time sequence of two-dimensional images), the segmented time sequence of two-dimensional images, or similar.

In some embodiments, the apparatus 100 may also comprise a communications interface (or circuitry) 108 for enabling the apparatus 100 to communicate with any interfaces, memories and devices that are internal or external to the apparatus 100. The communications interface 108 may communicate with any interfaces, memories and devices wirelessly or via a wired connection. For example, in an embodiment where one or more user interfaces 104 are external to the apparatus 100, the communications interface 108 may communicate with the one or more external user interfaces 104 wirelessly or via a wired connection. Similarly, in an embodiment where one or more memories 106 are external to the apparatus 100, the communications interface 108 may communicate with the one or more external memories 106 wirelessly or via a wired connection.

It will be appreciated that FIG. 1 only shows the components required to illustrate this aspect of the invention, and in a practical implementation the apparatus 100 may comprise additional components to those shown. For example, the apparatus 100 may comprise a battery or other power supply for powering the apparatus 100 or means for connecting the apparatus 100 to a mains power supply.

Figure 2:
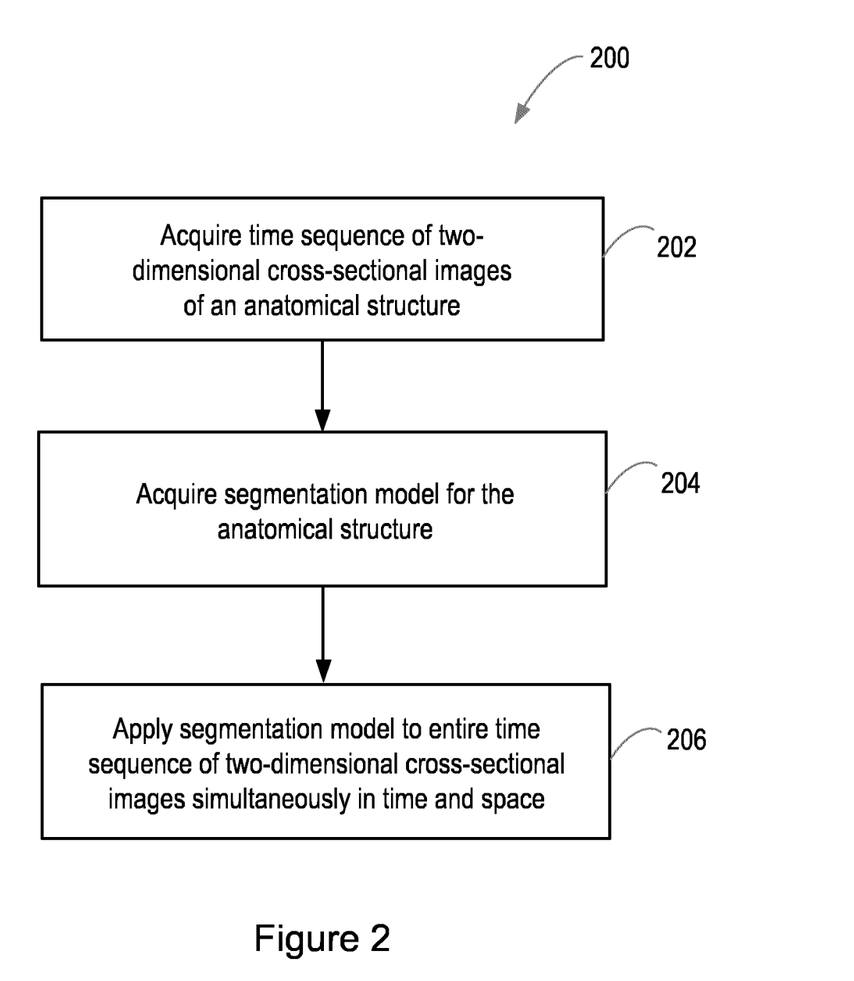
FIG. 2 is a flow chart illustrating a method according to an embodiment.

FIG. 2 illustrates a method 200 for segmenting two-dimensional images of an anatomical structure according to an embodiment. The illustrated method 200 can generally be performed by or under the control of the processor 102 of the apparatus 100.

With reference to FIG. 2, at block 202, a time sequence of two-dimensional images of the anatomical structure is acquired.

In some embodiments, each two-dimensional image of the anatomical structure may comprise a respective time stamp (or time instant) representative of a third dimension of the two-dimensional image. In these embodiments, the time stamps (or time instances) of the two-dimensional images can be converted into a spatial measure. For example, in some embodiments, the acquired sequence of two-dimensional images of the anatomical structure may be converted into a three-dimensional image volume. The three-dimensional image volume can comprise a plurality of voxels. In effect, the time sequence of two-dimensional images of the anatomical structure is interpreted as a three-dimensional (2D+t) image volume and, hence, as a three-dimensional object where the time is the third dimension.

The voxels of the three-dimensional (2D+t) image volume can have different units depending on the dimension. In two-dimensions, the unit is a distance unit such as millimetres (mm), whereas the third-dimension (z) has a time unit such as second (s) or millisecond (ms). Therefore, a conversion factor for the time dimension can be used to obtain a real three-dimensional volume. Thus, the conversion of the acquired time sequence of two-dimensional images of the anatomical structure into a spatial measure (such as a three-dimensional image volume) can be based on a conversion factor for the respective time stamps.

The conversion factor can, for example, be selected based on a level of anisotropy for the spatial measure (or three-dimensional image volume). In some embodiments, for example, the acquired time sequence of two-dimensional images of the anatomical structure may be converted in space in such a way that a voxel of the resulting three-dimensional image volume has the same, or similar, dimensions in each direction. For example, the conversion factor can be selected such that the voxels of the three-dimensional (2D+t) image volume are isotropic, or substantially isotropic (or not too anisotropic). In an embodiment where the anatomical structure in the time sequence of two-dimensional images is the heart, heart movements of approximately 5 mm/100 ms can be expected such that a conversion factor $z-z_0=t-t_0/20$ can be selected. Here, $\Delta t=t-t_0$ is the time difference between the time stamp of an arbitrary two-dimensional image of the sequence of two-dimensional images and the time stamp $t_0$ of the first two-dimensional image of the sequence of two-dimensional images, $z_0$ is the z coordinate (or the third dimension) of the new position of the first two-dimensional image of the sequence in the new three-dimensional volume, z is the z coordinate (or third dimension) in another arbitrary two-dimensional image of the sequence in the new three-dimensional volume, and $z-z_0$ is the distance between the spatial points z and $z_0$ along the third dimension. In this way, a spatial measure can be determined from the time stamps. The time difference t can be in millimetres (mm) and the distance between the spatial points can be in milliseconds (ms).

In some embodiments, the two-dimensional images of the anatomical structure in the time sequence can be stored as a three-dimensional volume such as in a memory 106 (which may be a memory of the apparatus 100 or a memory external to the apparatus 100). For example, this can be achieved by storing the two-dimensional images in order (or subsequently) in time in a single file such that the time becomes the third dimension, as described above.

Returning back to FIG. 2, at block 204, a segmentation model is acquired for the anatomical structure. The acquired segmentation model can be a deformable segmentation model. In some embodiments, the acquired segmentation mode can be a three-dimensional (2D+t) shape constraint deformable model. The segmentation model can be any segmentation model that allows the shape variability of the anatomical structure in the time sequence of two-dimensional images to be modelled over time.

The segmentation model for the anatomical structure comprises a plurality of segments. For example, in some embodiments, the segmentation model for the anatomical structure can comprise a mesh. In these embodiments, the mesh may comprise the plurality of segments. Herein, when referring to segments of the mesh, the segments may comprise the "faces" of the mesh, which are defined by the edges and vertices of the mesh structure. In some embodiments, the mesh can be a polygon or polygonal mesh (e.g. comprising polygonal segments or "faces"). In some embodiments, the (polygonal) mesh comprises a triangular mesh. In other words, in some embodiments, the segmentation model for the anatomical structure may comprise a plurality of triangular segments (or faces). In some embodiments, the plurality of segments (or the mesh) may be structured. For example, the plurality of segments may each be the same shape and optionally the same size. In other embodiments, the plurality of segments (or the mesh) may be unstructured. For example, one or more of the plurality of segments may be different shapes, one or more of the plurality of segments may be different sizes, or both. In some embodiments, the segmentation model may be a deformable segmentation model. For example, in embodiments where the segmentation model comprises a mesh, the mesh may be a deformable mesh.

In some embodiments, the plurality of segments (or the mesh) may be regular with respect to the two-dimensional cross-sectional images. For example, in some embodiments, it may be possible to identify segments in the segmentation model that correspond (or belong) to one time instance of the two-dimensional images and copy those segments to other time instances of the two-dimensional images. A pattern of segments in the segmentation model may be repeated in each two-dimensional image. In other embodiments, the plurality of segments (or the mesh) may be irregular with respect to the two-dimensional cross-sectional images. For example, it may not be possible to identify segments in the segmentation model that correspond (or belong) to one time instance of the two-dimensional images to copy those segments to other time instances of the two-dimensional images. A pattern of segments in the segmentation model may be different in at least one of the two-dimensional image.

The acquired segmentation model can be a continuous segmentation model in time and space. For example, each of the plurality of segments in the segmentation model (for example, the segments of a mesh) may be connected to at least one other segment. In some embodiments, the segmentation model (for example, comprising a mesh) can comprise one or more layers of segments. In these embodiments, each of the one or more layers of segments may be connected to at least one other layer of segments in the segmentation model (for example, comprising a mesh). The segments of the segmentation model can have any resolution that is sufficient for the segmentation that is performed on the time series of two-dimensional images of the anatomical structure.

In any of the embodiments described herein, as mentioned earlier, the acquired segmentation model for the anatomical structure can be configured to model a shape variability of the anatomical structure over time. In effect, the acquired segmentation model can have any resolution that is fine enough to cover the shape variability of the anatomical structure in the time sequence of two-dimensional images over time.

Although examples have been provided above for the form of the segmentation model, it will be understood that the segmentation model for the anatomical structure may comprise any other shaped or sized segments (or any other shaped or sized mesh).

As described above, a segmentation model is acquired at block 204 of FIG. 2. The segmentation model is then be introduced into the acquired time sequence of two-dimensional images. Thus, at block 206 of FIG. 2, the acquired segmentation model is applied to the time sequence of two-dimensional images of the anatomical structure to segment the time sequence of two-dimensional images by way of the plurality of segments. Specifically, the acquired segmentation model is applied to the entire (or whole, or complete) time sequence of two-dimensional images of the anatomical structure simultaneously in time and space to segment the time sequence of two-dimensional images by way of the plurality of segments. In this way, a single segmentation model covers both space and time simultaneously across the entire time sequence of two-dimensional images of the anatomical structure, rather than each two-dimensional image in the sequence independently. The entire time sequence of two-dimensional images are segmented together.

Figure 3:
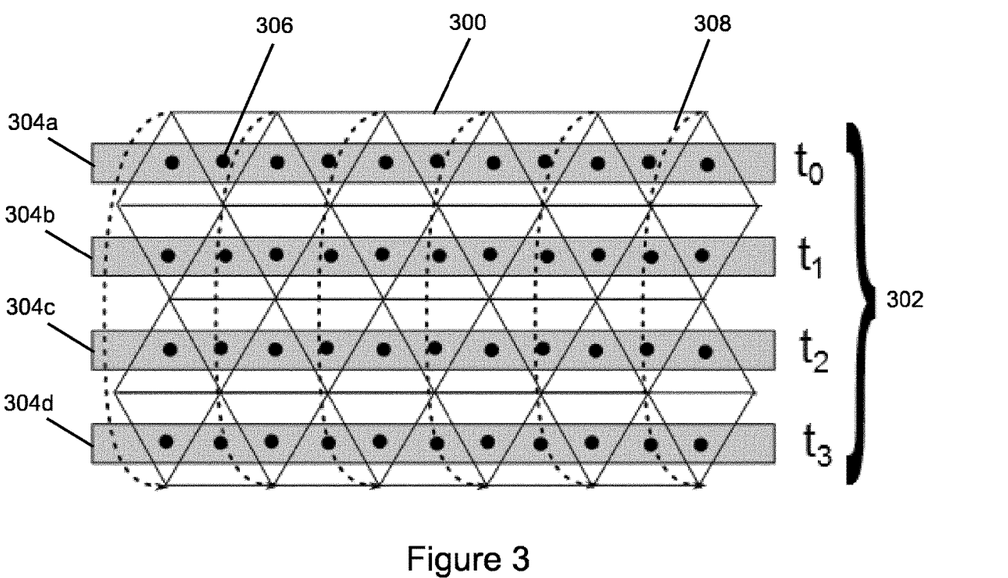
FIG. 3 is an illustration of a segmentation model applied to a time sequence of two-dimensional images according to an embodiment.

FIG. 3 is an illustration of a segmentation model 300 applied to a time sequence 302 of two-dimensional images 304a, 304b, 304c, 304d according to an embodiment. According to the illustrative example embodiment of FIG. 3, the segmentation model 300 is a structured geometric segmentation model comprising a plurality of triangular segments (or a triangular mesh) with a regular connectivity (for example, a structured mesh). However, as described earlier, various other forms of segmentation model are also possible.

According to the illustrative example embodiment of FIG. 3, a layer of segments of the segmentation model (for example, comprising a mesh) 300 is applied to each two-dimensional image 304a, 304b, 304c, 304d. However, it will be understood that in other embodiments, more than one layer of segments may be applied to at least one two-dimensional image. In this illustrative example embodiment, each segment is connected to another segment and each layer of segments is connected to another layer of segments.

In some embodiments, which will be described in more detail later, a boundary search may be performed and thus the segmentation model 304 can comprise a plurality of points 306 at which the boundary search may be performed.

In any of the embodiments described herein, the time sequence of two-dimensional images and the acquired segmentation model can be cyclic (for example, the anatomic structure may exhibit cyclic or periodic motion). Therefore, the acquired segmentation model may comprise a closed shape. The connection of the layers of the segmentation model 300 in the illustrative example embodiment of FIG. 3 to provide a cyclic segmentation model is shown by the dotted arrow 308.

Figure 4:
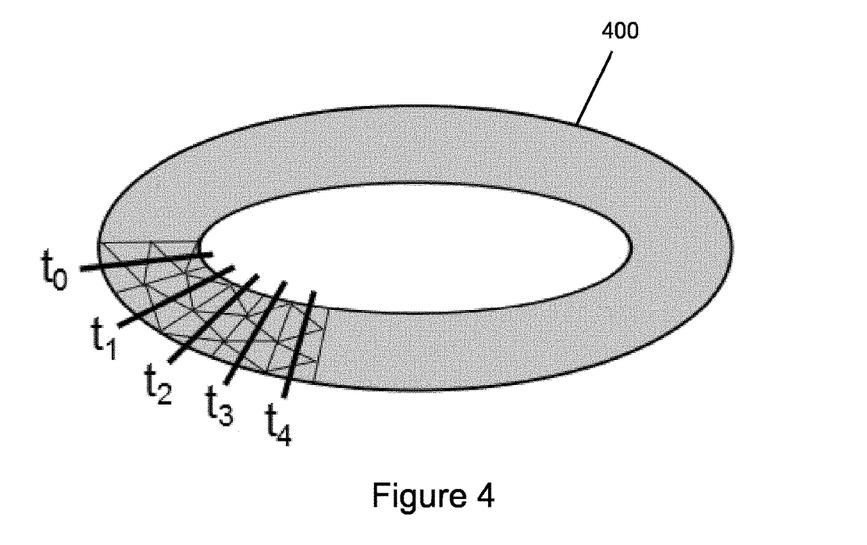
FIG. 4 is an illustration of a segmentation model applied to a time sequence of two-dimensional images according to an embodiment.

FIG. 4 is an illustration of a segmentation model 400 applied to a time sequence ($t_0$, $t_1$, $t_2$, $t_3$, $t_4$, to $t_{N-1}$, where N is the length of the periodic time sequence) of two-dimensional images according to an embodiment. In the illustrative example embodiment of FIG. 4, the time sequence of two-dimensional images and the acquired segmentation model are cyclic. Therefore, the acquired segmentation model form a closed shape with respect to the third dimension, which is time. The closed shape of the segmentation model 400 of FIG. 4 is due to the fact that the periodic time sequence of two-dimensional images comprises an instant $t_N$ that is equal to an initial time instant $t_0$, where N is the length of the periodic time sequence. The contour that is selected for each two-dimensional image can be of circular shape. However, it will be understood that this is only an example and the contour can be of any arbitrary shape.

Returning back to FIG. 2, the application of the acquired segmentation model to the time sequence of two-dimensional images of the anatomical structure at block 206 of FIG. 2 can comprise any suitable segmentation process, where the segmentation process is performed simultaneously in both time and space. The segmentation process can comprise any one or more segmentation stages, such as any one or more of localisation, global parametric transformation, piecewise parametric transformation, deformable adaptation, or any other segmentation stage, or any combination of segmentation stages, performed simultaneously in time and space. Any known localisation, global parametric transformation, piecewise parametric transformation, deformable adaptation, or other segmentation stages can be performed in this way.

For example, in some embodiments, applying the acquired segmentation model at block 206 of FIG. 2 can comprise, simultaneously in time and space, detecting the anatomical structure in the time sequence of two-dimensional images to place the segmentation model at the location of the anatomical structure in the time sequence of two-dimensional images.

Alternatively or in addition, applying the acquired segmentation model can comprise, simultaneously in time and space, transforming the segmentation model to correspond to the time sequence of two-dimensional images. In some embodiments, transforming the segmentation model may comprise a piecewise parametric transformation simultaneously in time and space to adapt a phase of the segmentation model to correspond to (or substantially correspond to) a phase of the time sequence of two-dimensional images. The piecewise parametric transformation with respect to the third dimension of time allows adaptation of the segmentation model to the phase of the time sequence of two-dimensional images.

In order to allow a piecewise parametric transformation of the segmentation model in time, different regions with the same parametric transformations are defined along the third dimension (which is time). For example, it may be assumed in the segmentation model that a certain change (for example, a contraction in an embodiment where the anatomical structure is the heart) occurs at a certain time. The piecewise parametric transformation may then comprise adapting the model with the piecewise parametric transformations (which can result in stretching the segmentation model, compressing the segmentation model, or any other transformation, or any combination of transformations for the defined time phases) over time. The transformations may correspond to different time phases of the anatomical structure.

Although not illustrated, it will be understood that a piecewise parametric transformation of the segmentation model may be performed in space in a similar manner to that described above with respect to time. For example, in some embodiments, different transformations may be applied to different parts of the anatomical structure. For example, in an embodiment where the anatomical structure is the heart, different transformations may be applied to the atrium and ventricle.

Figure 5:
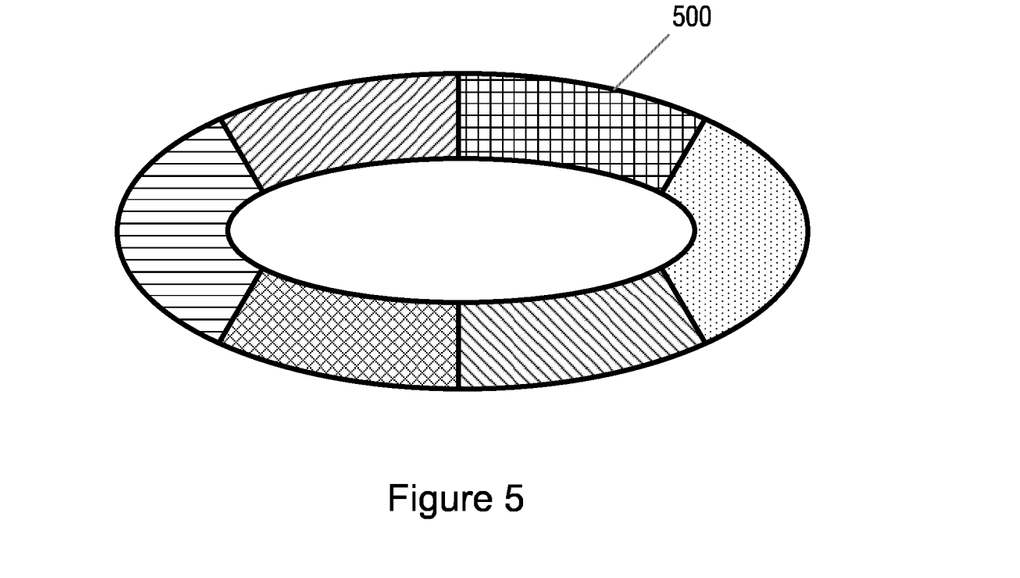
FIG. 5 is an illustration of a segmentation model for transformation according to an embodiment.

FIG. 5 is an illustration of a segmentation model 500 for transformation using a piecewise parametric transformation. As illustrated in FIG. 5, different regions with the same parametric transformations are defined along the third dimension of time to allow a piecewise parametric transformation of the segmentation model 500. In this way, it is possible to adapt the phase of the segmentation model 500 to correspond to (or substantially correspond to) a phase of the time sequence of two-dimensional images. In some embodiments, the piecewise parametric transformation of the segmentation model can be performed prior to fine-tuning the segmentation in a deformable adaptation, which will be described in more detail later.

The transformation of the segmentation model to correspond to the time sequence of two-dimensional images can comprise, simultaneously in time and space rotating the segmentation model to correspond to the anatomical structure in the time sequence of two-dimensional images. Alternatively or in addition, the transformation of the segmentation model to correspond to the time sequence of two-dimensional images can comprise, simultaneously in time and space, translating the segmentation model to correspond to the anatomical structure in the time sequence of two-dimensional images. Alternatively or in addition, the transformation of the segmentation model to correspond to the time sequence of two-dimensional images can comprise, simultaneously in time and space, scaling the segmentation model to correspond to the anatomical structure in the time sequence of two-dimensional images.

Although examples have been provided for the manner in which the segmentation model may be transformed to correspond to the time sequence of two-dimensional images, it will be understood that any other transformation, or any combination of transformations, of the segmentation model may be performed to adapt the segmentation model to correspond to the time sequence of two-dimensional images.

Alternatively or in addition, applying the acquired segmentation model at block 206 of FIG. 2 can comprise, simultaneously in time and space, deforming the segmentation model to adapt a shape of the segmentation model to a shape of the anatomical structure in the time sequence of two-dimensional images.

In some embodiments, the deformation of the segmentation model can comprise detecting one or more boundaries of the anatomical structure in the time sequence of two-dimensional images based on temporal and spatial characteristics in the time sequence of two-dimensional images. The deformation can then comprise attracting one or more of the plurality of segments of the segmentation model (for example, a centre of one or more of the plurality of segments of the segmentation model) to one or more target points on the detected one or more boundaries. Since the detection of one or more boundaries of the anatomical structure in the time sequence of two-dimensional images is based on both spatial and temporal characteristics, it is possible to detect both spatial and temporal variations in the time sequence of two-dimensional images.

Figure 6:
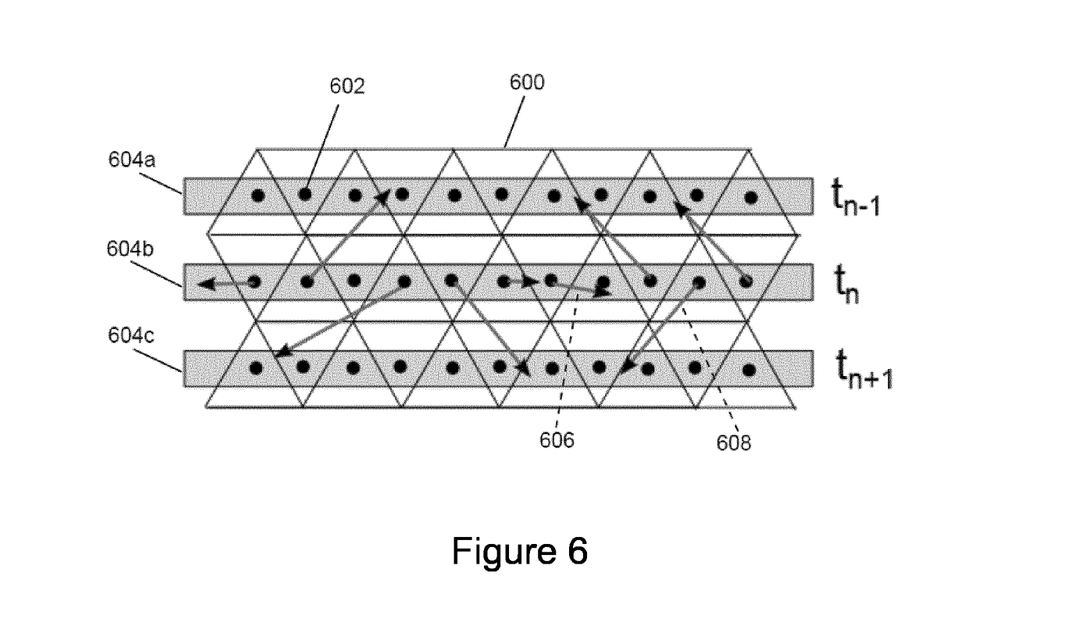
FIG. 6 is an illustration of a segmentation model for deformation according to an embodiment.

FIG. 6 is an illustration of a segmentation model 600 for deformation using target point detection. In this illustrated example embodiment, a plurality of target points are searched from the centres 602 of the plurality of segments simultaneously in space and time. However, it will be understood that the plurality of target points can be searched from any other location in the plurality of segments simultaneously in space and time. The plurality of target points are searched in space by searching in different directions in a two-dimensional image of the time sequence of two-dimensional images 604a, 604b, 604c (where one such direction is illustrated by the arrow 606). The plurality of target points are searched in space and time by searching in any one or more two-dimensional images in the time sequence of two-dimensional images 604a, 604b, 604c (as illustrated by the arrow 608). The one or more two-dimensional images that are searched in space and time may comprise one or more neighbouring two-dimensional images in the time sequence, one or more non-neighbouring two-dimensional images in the sequence, or any combination of two-dimensional images in the sequence. It will be understood that the radius of a search can be larger or smaller than that illustrated by the arrows in FIG. 6.

The detection of one or more boundaries of the anatomical structure can be performed for at least one segment of the segmentation model. In some embodiments, the detection of one or more boundaries of the anatomical structure may be performed for each segment of the segmentation model. In some embodiments, the detection of one or more boundaries of the anatomical structure may comprise a determination of the external energy for the segments. The external energy is the force that originates from the two-dimensional images and attracts the segmentation model to the one or more boundaries of the anatomical structure. An internal energy may also be used to provide stability to the shape of the segmentation model such as by defining certain shape constraints for the segmentation model.

Alternatively or in addition, in some embodiments, the detection of one or more boundaries of the anatomical structure may comprise extracting an intensity profile of the time sequence of two-dimensional images in time and space. For example, the plurality of target points searched from the centres 602 of the plurality of segments (or any other location) in different directions (illustrated by the arrows in FIG. 6) may be found in other two-dimensional images (at different time instances). The arrows illustrated in FIG. 6 indicate the search direction. Along the search direction an intensity profile may be extracted, which may be evaluated for a target point search (for example, at certain search positions). Then, for one or more of the plurality of segments of the segmentation model, one or more boundaries of the anatomical structure may be detected in the time sequence of two-dimensional images based on the extracted intensity profile resulting in new target points.

A search direction can be determined by a surface normal or any other direction of a segment (which is a triangular segment in this illustrative example embodiment but can be any other shaped segment, as described earlier). Depending on the curvature of the segmentation model and the length of the search profiles that are used, the boundary detection can lead to target points in a two-dimensional image of a different time. For example, the boundary detection can lead to target points in a two-dimensional image having a different third coordinate (time) between a current point and a target point.

Alternatively or in addition, in some embodiments, the detection of one or more boundaries of the anatomical structure may comprise using boundary detection functions for the evaluation of search positions of the search profile, which can include spatial and temporal characteristics. For example, spatial and temporal gradients may be evaluated to detect one or more boundaries of the anatomical structure. A boundary detection function may be evaluated at each search position along the search profile automatically in time and space. The evaluation of the boundary detection function can detect whether or not a boundary is present at each search position along the search profile. The evaluation can be based, for example, on a comparison of intensity characteristics of a neighbourhood (for example, gradients or any other spatial/temporal characteristics) automatically in time and space. The boundary detection function may be defined differently for different segments.

Thus, in the manner described above, the boundary detection can deform (or transform) the segmentation model in space and also in the third dimension of time. This can result in a segmentation model comprising a regular mesh losing its regularity. Also, the same contour of the segmentation model may no longer be associated with the same two-dimensional image following boundary detection. It is thus possible to acquire a subject-specific segmentation result. The boundary detection described above can be particularly useful where an additional anatomical structure appears in the two-dimensional images at an earlier time instant than expected (for example, where there is a change in the topology of a contour rather than a change only in the shape of the contour in the two-dimensional images) since the boundary detection is defined with respect to both space and time.

In any of the embodiments described herein, the time sequence of two-dimensional images and the acquired segmentation model can be cyclic. Therefore, the acquired segmentation model may comprise a closed shape. In effect, a cyclic boundary condition can be set for the time domain. This can be beneficial where the time sequence of two-dimensional images is a periodic time sequence (such as a heart cycle, a breathing cycle, or any other periodic time sequence).

In these embodiments, the detection of one or more boundaries of the anatomical structure may comprise extracting an intensity profile of the cyclic time sequence of two-dimensional images. Then, for one or more of the plurality of segments of the cyclic segmentation model, one or more boundaries of the anatomical structure may be detected in the cyclic time sequence of two-dimensional images based on the extracted intensity profile. The cyclic condition of the segmentation model and time sequence of two-dimensional images can be taken into account during the extraction of the intensity profile.

Figure 7:
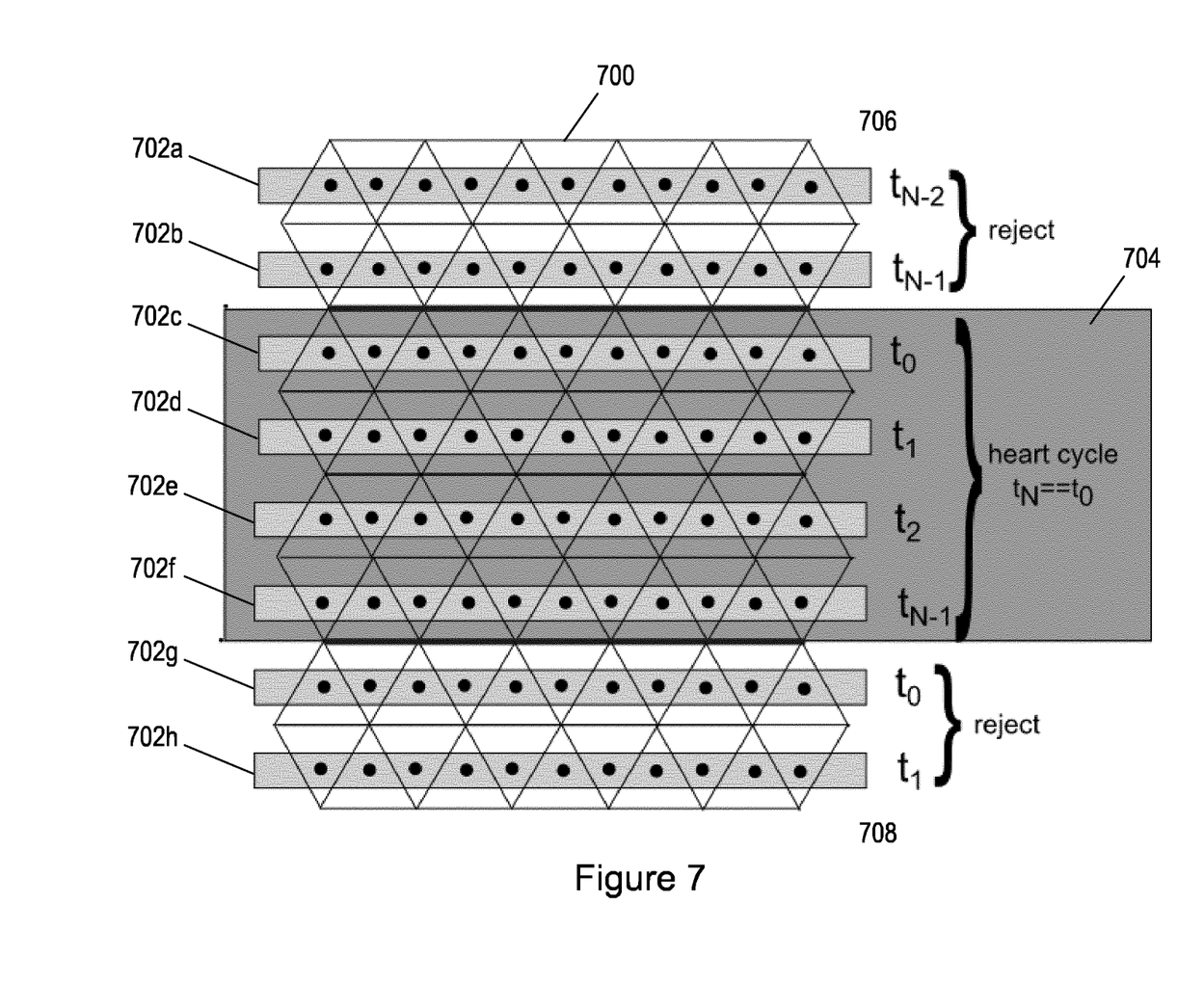
FIG. 7 is an illustration of a segmentation model applied to a time sequence of two-dimensional images according to an embodiment.

FIG. 7 is an illustration of a segmentation model 700 applied to a time sequence of two-dimensional images 702c, 702d, 702e, 702f of an anatomical structure according to an embodiment. The anatomical structure may be the heart or any other anatomical structure providing a periodic time sequence of two-dimensional images.

The periodic nature of the time sequence means that the time sequence of two-dimensional images and the segmentation model can be extended. The segmentation model initially comprises a closed mesh that is cut open between time $t_{N-1}$ and $t_0$. This results in two cut planes 706, 708 in the segmentation model 700. Then, the segmentation model is extended (or elongated) at both of the resulting cut planes 706, 708 since this is periodically correct. The time sequence of two-dimensional images 702c, 702d, 702e, 702f is also extended (or elongated) at the cut planes 706, 708 by repeating the time sequence. This is shown in FIG. 6 where two additional time instances 702a, 702b and 702g, 702h are provided at each of the cut planes 706, 708. The number of extended time instances at the cut planes 706, 708 depends on the strength of movement of the anatomical structure at the time instance $t_0$. The same periodically correct extension can be performed with the image volume.

Following the extension, one or more segmentation stages (for example, localisation, global parametric transformation, piecewise parametric transformation, deformable adaptation, or any other segmentation stage, or any combination of segmentation stages) are performed simultaneously in time and space on the extended time sequence of two-dimensional images 702a, 702b, 702c, 702d, 702e, 702f, 702g, 702h using the extended segmentation model 700. It is assumed that due to the smooth image transition at both of the cut planes 706, 708, the segmentation result is identical (or nearly identical) and the segment nodes of the cut planes 706, 708 end up at the same position (or substantially the same position) such that a subject-specific geometrical segmentation model 700 can be combined into its original closed shape again. Thus, according to the illustrated example embodiment, only a part 704 of the segmentation model 700 that corresponds to the original time sequence of two-dimensional images 702c, 702d, 702e, 702f (which, in this example, is the heart cycle) is retained, whereas the rest of the segmentation model 700 is removed after segmentation. The segmentation model 700 is then closed again at the cut planes 706, 708.

It will be understood that FIG. 7 illustrates only one example for applying a segmentation model to a periodic time sequence of two-dimensional images of an anatomical structure and that other examples are also possible. For example, in other embodiments (such as that illustrated in FIG. 3), the segmentation model is kept closed with respect to the third dimension (time) for segmentation. Instead, a cyclic boundary condition can be included for the third dimension (time) in the segmentation algorithm. In this case, cyclic information can be used in during the extraction of the intensity profiles (which can be used for the boundary detection) to ensure that the intensity is extracted from the correct two-dimensional image in the time sequence of two-dimensional images (where the two-dimensional image $t_0$ follows the two-dimensional image $t_{N-1}$).

In any of the embodiments described herein, the acquired segmentation model can comprise one or more characteristic features associated with one or more of the plurality of segments. In these embodiments, applying the acquired segmentation model can comprise, simultaneously in time and space, any one or more of detecting, transforming and deforming the segmentation model to correspond to the anatomical structure in the time sequence of two-dimensional images (as described above) based on one or more corresponding characteristic features of the anatomical structure in the time sequence of two-dimensional images.

In embodiments in which the plurality of segments (or the mesh) of the acquired segmentation model is regular, the application of the segmentation model to the time sequence of two-dimensional images in any of the manners described above can result in the plurality of segments (or the mesh) of the acquired segmentation model becoming irregular. As the segmentation model is adapted in the time and space domain, the contours of the anatomical structure may not be associated with the same time instance during the adaption process. For example, in the case of a ventricle contraction, certain anatomical parts such as the mitral valve can come into the field of view and are segmented by the segmentation model. Thus, the segmentation model may comprise information on the changes in the anatomical structure that occur over time. A parametric transformation can be used to identify the time instances at which the changes in the anatomical structure occur such that the segmentation model can be adapted accordingly. For example, the segmentation model may be adapted to correspond to a shape of a part of the anatomical structure that comes into the field of view.

Although not illustrated in FIG. 2, in any of the embodiments described herein, the method of FIG. 2 may further comprise rendering (or outputting or displaying) the segmented time sequence of two-dimensional images. For example, as described earlier, the control unit 102 may control one or more user interfaces 104 to render (or output or display) the segmented time sequence of two-dimensional images.

Although also not illustrated in FIG. 2, in any of the embodiments described herein, the method of FIG. 2 may further comprise processing the segmented time sequence of two-dimensional images to determine a movement pattern (for example, a pathological movement pattern) of the anatomical structure. The determined movement pattern of the anatomical structure can be compared to one or more movement pattern models, wherein each movement pattern model is associated with a disease. The movement pattern models and associated diseases may be stored in a memory 106 (which may be a memory of the apparatus 100 or an external memory). The movement pattern model with the best fit to the determined movement pattern can indicate the disease. In some embodiments, the segmentation model itself can comprise information on the expected behaviour of the anatomical structure with respect to time and a discrepancy from that information with respect to time (such as during a parametric transformation) can indicate a disease. In this way, it is possible to determine a disease associated with the determined movement pattern.

There is therefore provided an improved method and apparatus for segmenting two-dimensional images of an anatomical structure. The method and apparatus described herein can be used for the segmentation of any arbitrary anatomical structures (for example, organs or any other anatomical structure) in a time sequence of two-dimensional images. The method and apparatus allows the shape variability of an anatomical structure to be modelled over time. For example, in an embodiment where the anatomical structure is the heart, the movements of the heart (such as contractions) can be modelled over time. The method and apparatus can provide a useful two-dimensional extension to a three-dimensional model based framework. The method and apparatus can be valuable in medical imaging analysis and visualisation tools.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for segmenting a time sequence of two-dimensional images of an anatomical structure, the method comprising:
    acquiring a time sequence of two-dimensional images of the anatomical structure;
    acquiring a segmentation model for the anatomical structure, wherein the segmentation model comprises a plurality of segments; and
    applying the acquired segmentation model to the entire time sequence of two-dimensional images of the anatomical structure simultaneously in time and space to segment the time sequence of two-dimensional images by way of the segmentation model, said applying comprising:
    detecting one or more boundaries of the anatomical structure in the time sequence of two-dimensional images based on temporal and spatial characteristics in the time sequence of two-dimensional images; and
    attracting one or more of the plurality of segments of the segmentation model to one or more target points on the detected one or more boundaries, and attracting comprising searching the one or more target points simultaneously in space and time.

2. The method as claimed in claim 1, wherein each two-dimensional image of the anatomical structure comprises a respective time stamp representative of a third dimension of the two-dimensional image.

3. The method as claimed in claim 2, further comprising:
    converting the acquired time sequence of two-dimensional images of the anatomical structure into a three-dimensional image volume based on a conversion factor for the respective time stamps.

4. The method as claimed in claim 3, where the conversion factor is selected based on a level of anisotropy for the three-dimensional image volume and wherein the conversion factor is selected to obtain substantially isotropic voxels.

5. The method as claimed in claim 1, wherein the acquired segmentation model for the anatomical structure is configured to model a shape variability of the anatomical structure over time.

6. The method as claimed in any claim 1, wherein the segmentation model comprises one or more layers of segments and at least one layer of segments is applied to each two-dimensional image.

7. The method as claimed in claim 6, wherein each of the one or more layers of segments is connected to at least one other layer of segments.

8. The method as claimed in claim 1, wherein applying the acquired segmentation model comprises any one or more of:
    simultaneously in time and space, detecting the anatomical structure in the time sequence of two-dimensional images to place the segmentation model at the location of the anatomical structure in the time sequence of two-dimensional images;
    simultaneously in time and space, transforming the segmentation model to correspond to the time sequence of two-dimensional images; and
    simultaneously in time and space, deforming the segmentation model to adapt a shape of the segmentation model to a shape of the anatomical structure in the time sequence of two-dimensional images.

9. The method as claimed in claim 8, wherein transforming the segmentation model comprises a piecewise parametric transformation simultaneously in time and space to adapt a phase of the segmentation model to correspond to a phase of the time sequence of two-dimensional images.

10. The method as claimed in any claim 1, wherein the time sequence of two-dimensional images and the acquired segmentation model are cyclic.

11. The method as claimed in claim 10, the method further comprising:
 extracting an intensity profile of the cyclic time sequence of two-dimensional images in time and space; and
 for one or more segments of the cyclic segmentation model, detecting one or more boundaries of the anatomical structure in the cyclic time sequence of two-dimensional images based on the extracted intensity profile.

12. The method as claimed in claim 1, the method further comprising:
 processing the segmented time sequence of two-dimensional images to determine a movement pattern of the anatomical structure; and
 comparing the determined movement pattern of the anatomical structure to one or more movement pattern models, wherein each movement pattern model is associated with a disease, to determine a disease associated with the determined movement pattern.

13. The method as claimed in claim 1, wherein each two-dimensional image of the anatomical structure comprises a respective time stamp representative of a third dimension of the two-dimensional image, and further comprising: converting the acquired time sequence of two-dimensional images of the anatomical structure into a three-dimensional image volume based on a conversion factor for the respective time stamps.

14. The method as claimed in claim 1, wherein the acquired segmentation model for the anatomical structure is configured to model a shape variability of the anatomical structure over time.

15. An apparatus for segmenting a time sequence of two-dimensional images of an anatomical structure, the apparatus comprising:
 a processor configured to:
 acquire a time sequence of two-dimensional images of the anatomical structure;
 acquire a segmentation model for the anatomical structure, wherein the segmentation model comprises a plurality of segments; and
 apply the acquired segmentation model to the entire time sequence of two-dimensional images of the anatomical structure simultaneously in time and space to segment the time sequence of two-dimensional images using the segmentation model, said applying comprising:
 detecting one or more boundaries of the anatomical structure in the time sequence of two-dimensional images based on temporal and spatial characteristics in the time sequence of two-dimensional images; and
 attracting one or more of the plurality of segments of the segmentation model to one or more target points on the detected one or more boundaries, said attracting comprising searching the one or more target points simultaneously in space and time.

16. The apparatus as claimed in claim 15, wherein the processor is configured to control one or more user interfaces to render the segmented time sequence of two-dimensional images.

17. A non-transitory computer readable medium encoded with computer readable instructions which when executed by a processor cause the processor to:
 acquire a time sequence of two-dimensional images of the anatomical structure;
 acquire a segmentation model for the anatomical structure, wherein the segmentation model comprises a plurality of segments; and
 apply the acquired segmentation model to the entire time sequence of two-dimensional images of the anatomical structure simultaneously in time and space to segment the time sequence of two-dimensional images using the segmentation model, said applying comprising:
 detecting one or more boundaries of the anatomical structure in the time sequence of two-dimensional images based on temporal and spatial characteristics in the time sequence of two-dimensional images; and
 attracting one or more of the plurality of segments of the segmentation model to one or more target points on the detected one or more boundaries, said attracting comprising searching the one or more target points simultaneously in space and time.

18. The non-transitory computer readable medium as claimed in claim 17, wherein the segmentation model comprises one or more layers of segments and at least one layer of segments is applied to each two-dimensional image.

19. The non-transitory computer readable medium as claimed in claim 17, wherein applying the acquired segmentation model comprises any one or more of:
 simultaneously in time and space, detecting the anatomical structure in the time sequence of two-dimensional images to place the segmentation model at the location of the anatomical structure in the time sequence of two-dimensional images;
 simultaneously in time and space, transforming the segmentation model to correspond to the time sequence of two-dimensional images; and
 simultaneously in time and space, deforming the segmentation model to adapt a shape of the segmentation model to a shape of the anatomical structure in the time sequence of two-dimensional images.

20. The non-transitory computer readable medium as claimed in claim 17, wherein the time sequence of two-dimensional images and the acquired segmentation model are cyclic.

* * * * *